United States Patent [19]

Maust, deceased

[11] Patent Number: 4,800,902
[45] Date of Patent: Jan. 31, 1989

[54] SEED-CROP HARVESTING MACHINE AND METHOD FOR CONVERTING A SEED-CROP HARVESTING MACHINE INTO ONE WHICH CAN BE USED FOR HARVESTING FRAGILE SEED-CROPS

[75] Inventor: Gale E. Maust, deceased, late of Bay Port, Mich., by Sharon S. Maust, personal representative

[73] Assignee: Maust Enterprises, Inc., Bayport, Mich.

[21] Appl. No.: 37,706

[22] Filed: Apr. 13, 1987

[51] Int. Cl.$^4$ .................... A01F 12/46; A01D 45/00
[52] U.S. Cl. .................... 130/27 R; 56/330
[58] Field of Search .................... 130/27 R, 27 F; 56/14.6, 14.5, 10.2, 330

[56] References Cited

U.S. PATENT DOCUMENTS

| | | | |
|---|---|---|---|
| 2,202,760 | 5/1940 | Fank | 130/27 F |
| 3,680,291 | 8/1972 | Soteropulos | 56/16.6 |
| 3,777,463 | 12/1973 | Claxton | 56/330 |
| 3,848,609 | 11/1974 | Mortier et al. | 130/27 T |
| 4,241,566 | 12/1980 | Webster | 56/14.6 |
| 4,467,818 | 8/1984 | Donaldson et al. | 56/14.6 |
| 4,470,420 | 9/1984 | Hanaway | 130/27 F |

*Primary Examiner*—Paul J. Hirsch
*Attorney, Agent, or Firm*—Gordon W. Hueschen

[57] ABSTRACT

There is disclosed a seed-crop harvester which has been converted to provide elevation of the seed from the separation to a storage bin by a bucket-type elevator and discharge of the seeds from the storage bin laterally and downwardly into a hopper on a belt-type conveyor. The conversion eliminates or minimizes attrition which previously occurred when the seeds were dragged in contact with a metal surface in the screw- and drag-type conveyors and elevators previously used. Details of construction and mounting of the bucket-type elevator and the pivotal mounting of the belt-type conveyor with its hopper and flexible hood as well as other significant aspects of the invention are fully disclosed.

12 Claims, 3 Drawing Sheets

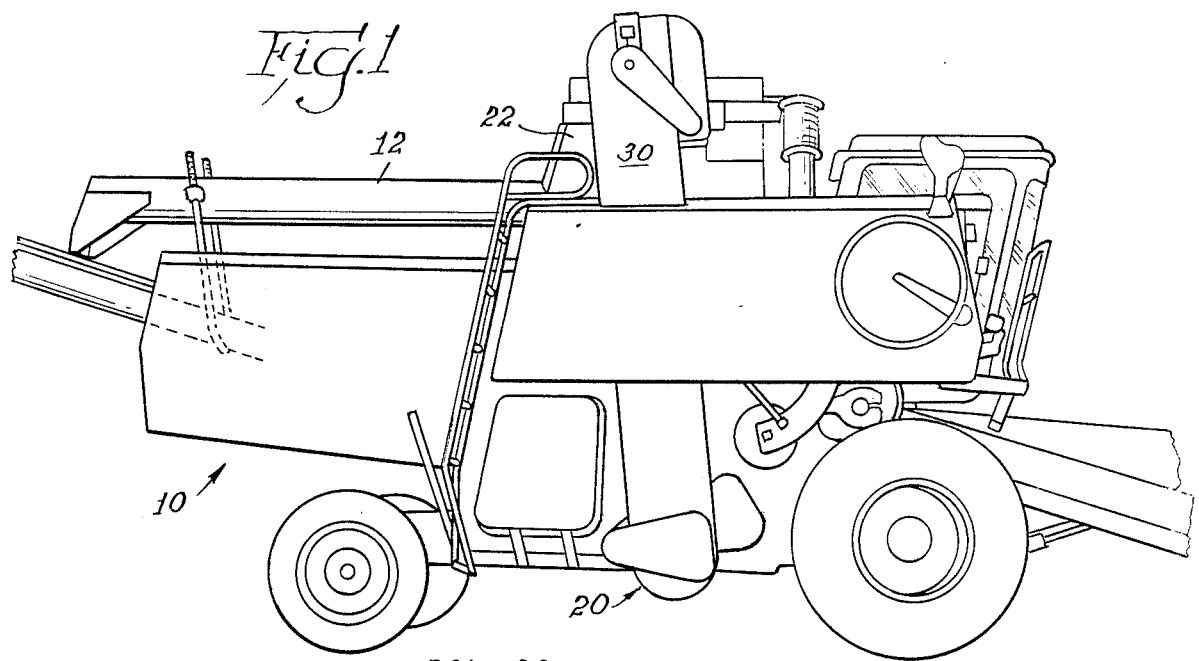
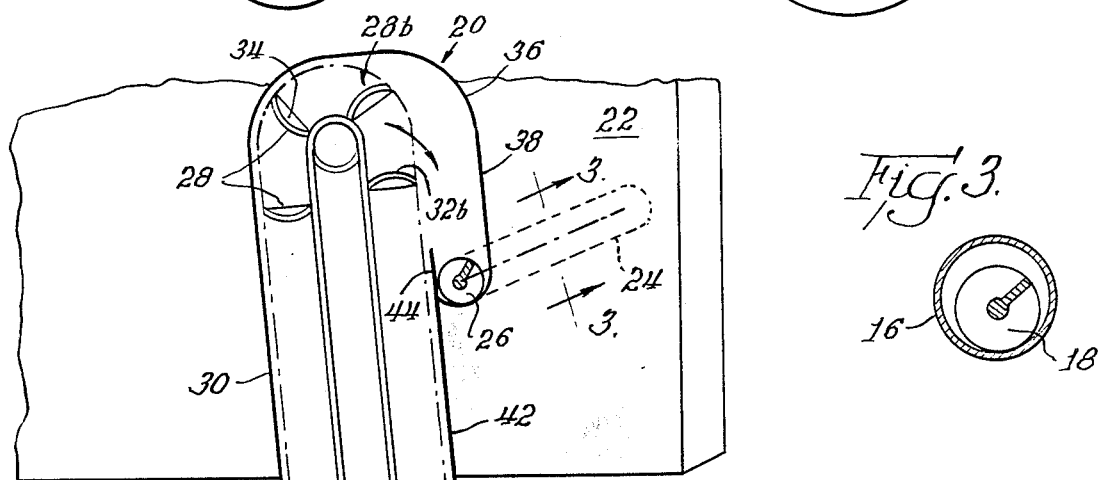
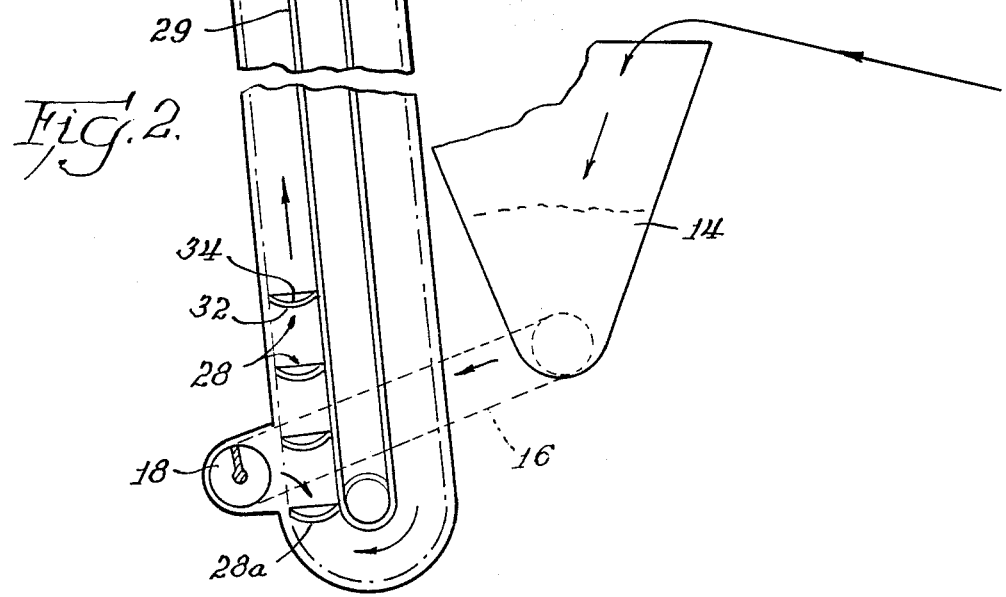

U.S. Patent    Jan. 31, 1989    Sheet 3 of 3    4,800,902
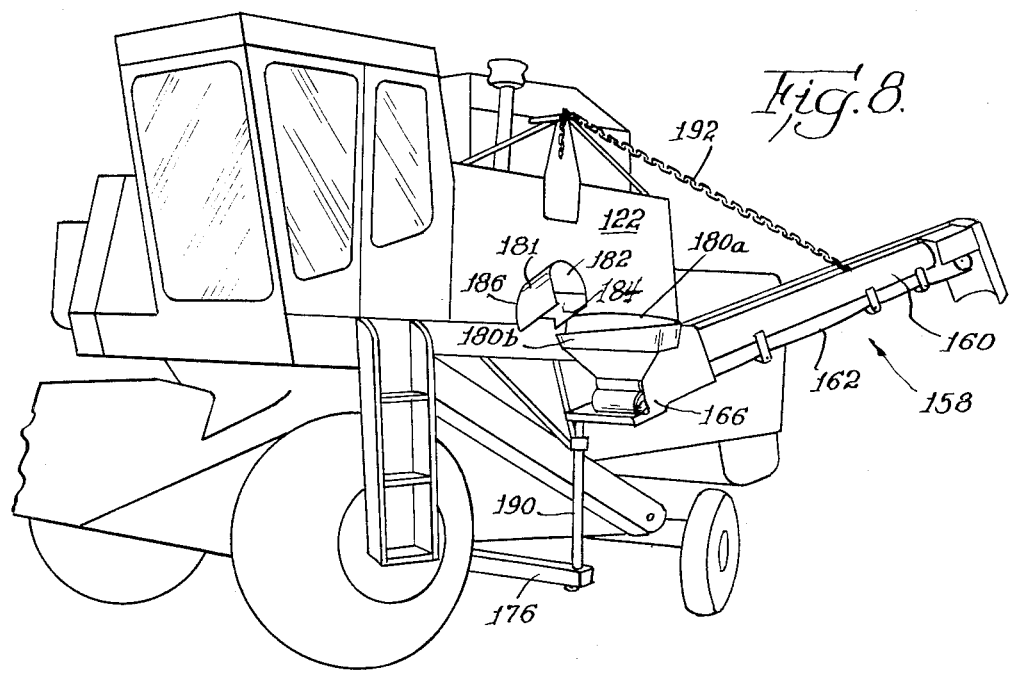
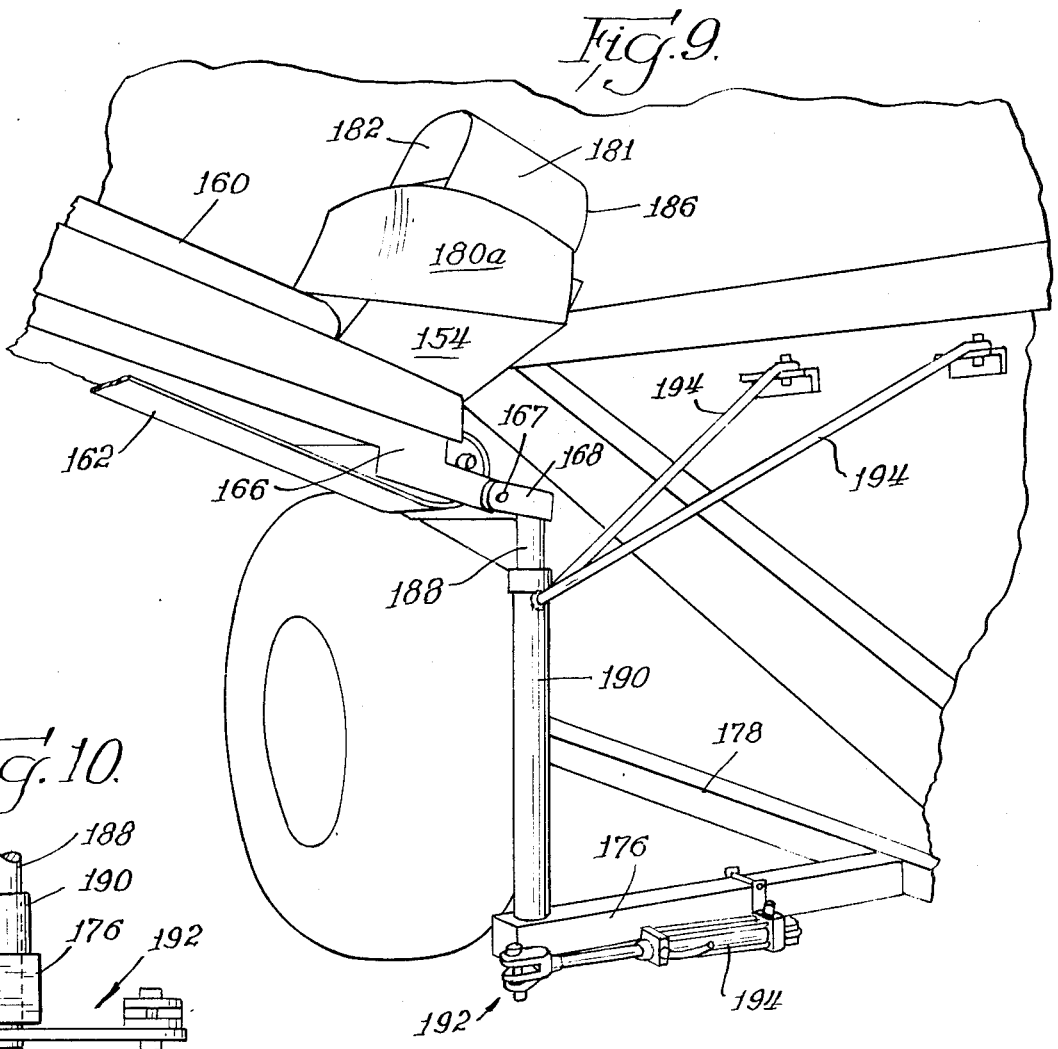
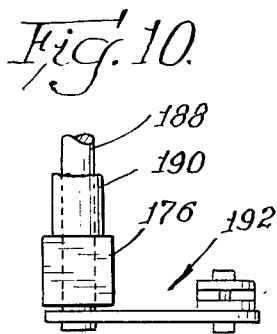

SEED-CROP HARVESTING MACHINE AND METHOD FOR CONVERTING A SEED-CROP HARVESTING MACHINE INTO ONE WHICH CAN BE USED FOR HARVESTING FRAGILE SEED-CROPS

FIELD OF INVENTION

This invention relates to a seed-crop harvesting machine which can be used for harvesting fragile seed-crops such as Great Northern and Michigan beans and to a method for converting a seed-crop harvesting machine having a discharge with a vertical screw component into a seed-crop harvesting machine which can be used for harvesting fragile seed-crops.

PRIOR ART

The combines or seed-crop harvesting machines available today have means for gathering and separating the seed from the stalks and/or pods, means for elevating the separated seed into a storage bin, and means for transferring the seed from the storage bin to a supplemental storage facility, such as a wagon or the like. The transfer means normally comprises a tubular conveyor having a long horizontal component that can be swung over the supplemental storage facility when it is brought alongside the harvesting machine. It also has a vertical component having a screw to lift the seed from the storage bin to the horizontal component and to push the seed along the same to a discharge chute.

Such devices have the disadvantage that, whereas they work extremely well with sturdy non-fragile seed-crops, such as wheat and soy beans, they do not work well with fragile crops, such as Great Northern and Michigan beans. The attrition between the screw and these beans, especially when there is dirt mingled with the beans, causes the skin on the beans to burst thus rendering them unfit for canning and like uses. Similar problems are encountered in elevating the beans to the storage bin as the means heretofore used drag the beans along in contact with an elevator housing much like the screw conveyor hauls them along in contact with the conveyor housing. Nevertheless, these harvesters still have so many desirable features and uses that they are produced in quantity. However, there is a substantial need for their conversion into seed-crop harvesters which can be used effectively for harvesting fragile seed-crops and for services for effecting such conversion.

OBJECTS OF THE INVENTION

It is an object of the invention to provide a seed-crop harvesting machine of the class described which can be used effectively for harvesting fragile seed-crops.

It is another object of the invention to provide a method whereby existing seed-crop harvesting machines can be converted into such machines which can be used effectively for harvesting fragile seed-crops.

Other objects are to avoid the disadvantages of the prior art and to obtain such advantages as will appear as the description proceeds.

SUMMARY OF THE INVENTION

This invention relates, inter alia, to improvements in a seed-crop harvesting machine which comprises:
gathering means for gathering seed-crop plants;
separating means for separating the seed from the stalks and/or pods of the plants;
a storage bin;
elevator means for elevating the separated seed to said storage bin; and
conveyor means for conveying separated seed from said storage bin to a supplemental storage facility not a part of said harvesting machine;
which adapt said seed-crop harvesting machine to the harvesting of fragile seed-crops and in which:
said elevator means comprises a bucket elevator means;
said conveyor means comprises a belt conveyor means, and
said elevator means and said conveyor means function to carry the separated seed rather than to drag it along,
whereby attrition of the skins of the seeds is minimized or avoided.

The invention also comprises one or more additional features in which
said bucket elevator means comprises:
upcoming and downcoming buckets disposed on a continuous belt;
buckets having rounded bottoms and cup-shaped tops;
sump means adjacent the uppermost downcoming buckets;
diverting means for diverting the seeds into said sump means as they spill from said cup-shaped buckets which comprises in part the rounded bottom of the downcoming bucket next below the one from which the seeds are spilled and in part a vertical wall separating said sump from the downcoming buckets and terminating between the positions occupied by the first and second downcoming buckets below the bucket from which the seeds are spilled; and
transverse means in said sump means for transferring seeds collected therein to said storage bin; and, if desired;
in which
said elevator means comprises a housing, the sides of which are adjacent and parallel to upcoming and downcoming buckets except at the top where said housing merges into said sump means with the topmost portion of said housing flaring away from the topmost buckets on the downcoming side, then down to said sump, and then upward as said vertical wall; and if desired;
which further comprises second transverse means for transferring separated seeds to said bucket elevator which second transverse means is located adjacent the bottom of said bucket elevator in position to discharge into upcoming buckets therein, and if desired;
in which
either said housing extends upwardly from adjacent said second transverse means at a slight angle to a point adjacent the top of said storage bin and adjacent to said first transverse means; and
said angle is such that the free-fall vector of the spilling seeds forms a small acute angle with the centerline of the downcoming buckets, thereby placing the rounded bottom of the downcoming bucket next below that from which the seeds are spilled more directly into the path of the falling seeds; or
both said transverse means comprise transverse screws disposed in transverse tubular housings having substantially horizontal bottoms;

said transverse tubular housings are substantially larger in diameter than the vertical dimension of said screws, whereby the seeds are freely urged along the horizontal bottoms of said housings so that attrition of the seeds between the screw and the walls of the housing is minimized or avoided.

The invention also includes one or more further features in which:

the storage bin is provided with a side delivery opening having a downwardly-opening discharge opening and said belt conveyor is provided with a hopper adapted to be disposed beneath said downwardly-opening discharge opening;

the hopper of the belt conveyor is hinged to said machine so that in one position the belt conveyor lies alongside of the machine and in another position it is disposed normally thereto for delivery to said supplemental storage facility and in the normally-disposed position said hopper is disposed under and in alignment with said discharge opening;

the hopper has a flexible boot adapted to encompass said discharge opening when the conveyor is swung to the normally-disposed position; and the boot is shaped relative to the discharge opening so that it swings into engagement under the discharge opening when the conveyor is swung to the normally-disposed position; and in which either:

the discharge opening is in the underside of a short projecting tube which communicates with said storage bin and through which tube and discharge opening the seeds in said storage bin are discharged;

said tube has a small upward slant so that the end away from said machine is at a slightly higher elevation than the end adjacent the machine; and said boot tapering from a high side which is high enough to lap said tube to a low side which is adapted to pass under said tube as the conveyor is swung to normally-disposed position, whereby said boot is lapped around said tube and encompasses said discharge opening; or said discharge opening comprises a vertically-disposed chute and said boot has outwardly flaring sides adapted loosely to encompass said chute when said conveyor is swung to normally-disposed position.

The invention also comprises a method for converting a seed-crop harvesting machine into such a machine which can be used for harvesting of fragile seed-crops, which machine comprises a separator; a storage bin; elevator means for elevating separated seeds to said storage bin; sump means communicating with said storage bin; and a screw conveyor having a vertical component for transferring the seeds from said sump to a supplemental storage facility, which method comprises:

providing a lateral discharge chute opening into said sump and having a bottom discharge opening exterior of said storage bin;

mounting a belt conveyor provided with a generally rectangular-mouthed hopper in such a manner that the conveyor can be swung from a position alongside of said machine to a position normal thereto;

said hopper being mounted on hinge means such that the conveyor pivots about a corner of the hopper which is adjacent the machine in both positions of said conveyor whereby, when the conveyor is swung around to the normally-disposed position, the hopper is centered under the discharge opening;

mounting a flexible boot on said hopper which is shaped relative to the discharge opening so that it swings in under the discharge opening when the conveyor is swung to the normally-disposed position; and replacing said elevator means with a bucket elevator means;

in which, if desired;

the discharge opening is provided in the underside of a short projecting tube which communicates with said storage bin and through which tube and discharge opening the seeds in said storage bin are discharged;

said tube has a small upward slant so that the end away from said machine is at a slightly higher elevation than the end adjacent the machine; and which further comprises:

tapering said boot from a high side which is high enough to lap said tube to a low side which is adapted to pass under said tube as the conveyor is swung to the normally-disposed position, whereby said boot is lapped around said tube and encompasses the discharge opening; and in which, if desired;

said discharge opening is provided in the bottom of a vertically disposed chute and which further comprises:

outwardly flaring the sides of said boot so that they loosely encompass the outside of said chute when said conveyor is swung to normally-disposed position.

BRIEF DESCRIPTION OF THE DRAWINGS

FIG. 1 is a side elevation of one side of a seed-crop harvester of the invention;

FIG. 2 is a detail view of FIG. 1;

FIG. 3 is a detail view in section taken on line 3—3 of FIG. 2;

FIG. 8 is a perspective view of another form of the invention;

FIG. 9 is a detail view of FIG. 8; and

FIG. 10 is a detail view of FIG. 9.

DESCRIPTION OF PREFERRED EMBODIMENTS OF THE INVENTION

Figure 4:
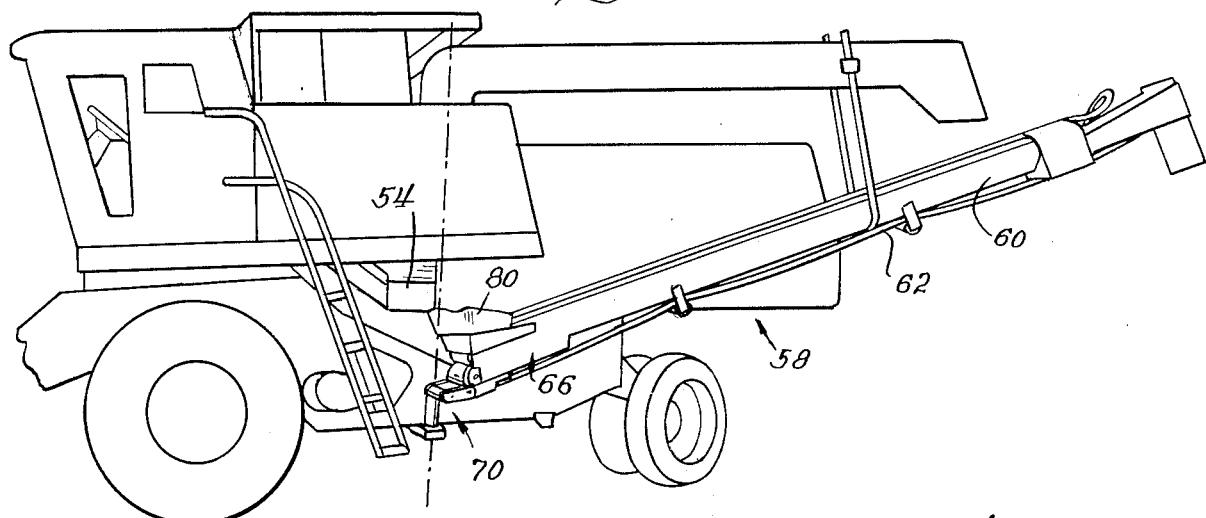
FIG. 4 is a side elevation of the other side of FIG. 1.

In FIGS. 1 and 4 are shown obverse and reverse sides of a preferred modification of a seed-crop harvester 10 of the invention.

As the invention is directed to the modification of commercial forms of such harvesters, only those portions which are modified will be described in detail. Thus, the means for gathering the plants and separating the seeds from the stalks or pods, etc., are conventional details which are not part of the invention. So are the construction and location of the storage bin; construction and location of hydraulic lines; powerplant and drives; the means for collecting and delivery of the separated seeds to the elevator; and the details of the overhead conveyor, which is shown at 12. Suffice it to say that, in the prior art devices, the storage bin discharges into a sump which is emptied by a vertically-disposed auger or screw (not shown) which feeds the overhead conveyor. In the present invention, this auger and overhead conveyor are inactivated and the seeds are removed from the storage bin by other means which will presently be described.

In the operation of the modified device according to the invention, the separated seeds are collected in an accumulator, shown diagramatically at 14 in FIG. 2, from which they are transferred by a horizontally-disposed tube 16 having a propelling screw or auger 18 therein. The tube 16 conveys the separated seeds to the bottom of an elevator 20 which in turn elevates the separated seeds to the top of the harvester where they are discharged into the storage bin 22 by means of a horizontally-disposed tube 24 which leads from the conveyor 20 into the storage bin 22. A screw or auger 26 propels the seeds along the tube 24 into the storage bin 22.

One of the problems in the prior art devices arises from the use of equipment for moving the seeds in which they are dragged along in contact with a metal surface by a screw or some other form of drag. To be effective for this purpose, especially when the seeds are being moved to a higher elevation, close tolerances between the drag and the housing is necessary. With fragile seeds, such as Great Northern and Michigan beans, such close tolerances cause sufficient attrition to rupture the fragile skin of the beans thus making them unsuitable for some purposes. This problem is aggravated by the dirt which is invariably associated with the beans in such operations. To this end the tubes 16 and 24 are kept as nearly horizontal as practical and are made considerably larger in diameter than the screws 18 and 26, as best seen in FIG. 3, in order to hold attrition to a minimum.

For the same reasons, the seeds are elevated to, the storage bin 22 in buckets 28 fastened to a continuous chain or belt 29 in a housing 30. The buckets 28 have rounded bottoms 32 and cup-shaped tops 34 and the tube conveyor 16 is located to discharge the seeds laterally into the cup-shaped bucket 28a just after it starts its vertical ascent. The seeds being protected in the cups of the cup-shaped buckets are thus kept out of contact with the housing 30.

At the top of the elevator 20, the housing 30 flares out at 36 away from the downcoming buckets 28, continues down vertically at 38 to a sump 40 which communicates with the tube conveyor 24. The sump 40 merges with the downcoming wall 42 of the housing 30 which continues up past the bottom of the sump as shown at 44 far enough to provide means for deflecting the seeds into sump 40.

When the buckets reach the top and start down as shown at 28b, the seeds are spilled out into the sump 40. As they fall, they hit the rounded bottom 32 of the next lower bucket and are thus bounced into the sump 40. The vertical wall 44 prevents them from being diverted back into the housing.

The housing 30 slopes upwardly at a slight angle as the bottom is disposed to the forward side of the conveyor tube 16 and to the rearward side of the conveyor tube 24. This slope provides an advantage in that the free-fall vector of the spilled seeds is at a slight acute angle to the centerline of the downcoming buckets. In effect, the bottom 32b of the bucket from which the seeds bounce off is moved more into the line of fall of the spilled seeds. As a consequence, the seeds are more effectively bounced off of the rounded bottom of the bucket 32b. The angle suitably can be about 5 degrees, more or less.

By the structure just described, fragile seeds are moved up into the storage bin with a minimum of damage. Now, to get them out without damage, a modification of the means for doing so is required.

For this purpose the overhead conveyor is inactivated and the seeds are taken out through the side of the storage bin Advantageously, the side wall of the bin is opened up into the sump. This sump is described above but not shown because it is standard in this art. The seeds are raked out of this sump, as by screws, not shown, driven by sprockets 50 into a housing 52. The housing 52 has a downwardly-opening chute 54 provided with a gate valve 56 for shutting off the flow of seeds from the chute.

Figure 6:
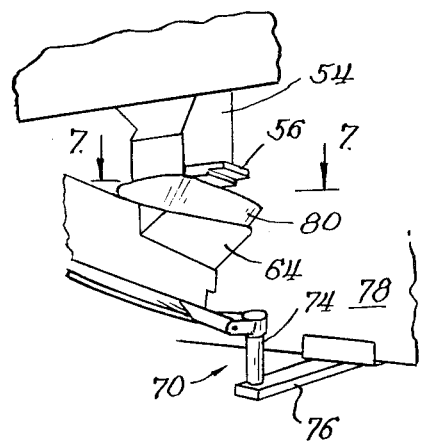
FIG. 6 is a detail view of FIG. 4 with the belt conveyor in the normally-disposed position.
Figure 7:
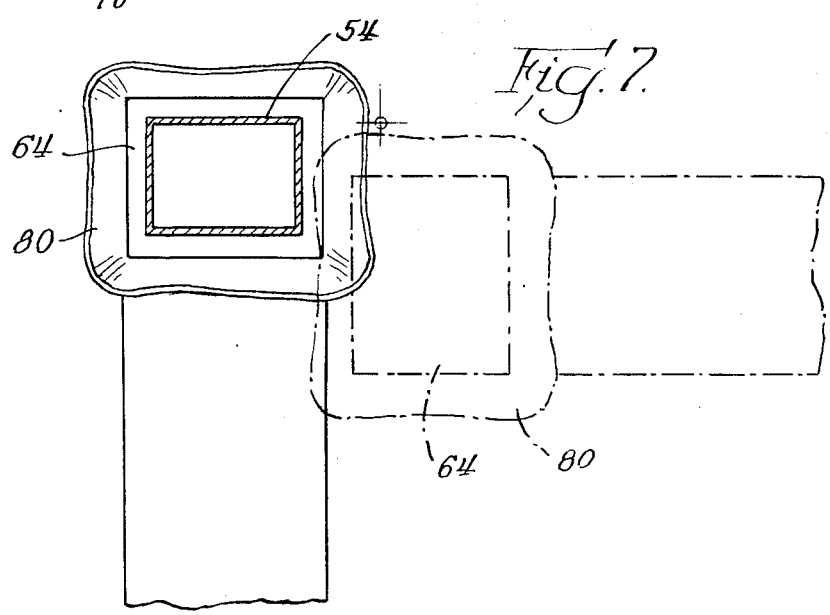
FIG. 7 is a detail view looking in the direction of the arrows 7—7 of FIG. 6 showing, in broken lines, the hopper and belt-conveyor in the alongside position.

Mounted on the side of the harvester 10 is a belt conveyor 58 which comprises a hollow tube 60 having a belt 62 running up through the tube 60 and down along the bottom outside of the tube 60. The belt is endless and may have a roughened surface if desired. The tube 60 has a hopper 64 mounted on the lower end to channel seeds onto the continuous belt 62 and the tube 60 is mounted on a frame member 66 which in turn is pivoted at 67 to arms 68. The arms are in the form of a yoke 70, the crosspiece 72 of which is mounted on a pivot post 74 mounted on an extension 76 of the frame 78 of the harvester 10. The pivot post 74 is fastened to the near side of the yoke 70, that is, to the side nearest the harvester in FIG. 4. Thus, when the conveyor 58 is swung from the position shown in FIG. 4 to a position in which it is mormal to the harvester, the hopper 64 will swing in under the chute 54 as best seen in FIGS. 6 and 7. The upper edges of the hopper 64 are provided with a flexible boot 80 which rides in under the chute 54 when the conveyor 58 is swung from the alongside position to the normally-disposed position and closely encompasses the hopper walls as best seen in FIG. 6.

The conveyor 58 is supported by the overhead conveyor 12 and the two are swung in unison to the normally-disposed position. This has the avantage that the means, not shown, for moving the overhead conveyor 12 is utilized for moving the belt conveyor 58. The pivots 72 allow the conveyor 58 to be raised or lowered by adjusting the supporting straps 82.

In the modification shown in FIGS. 8 and 9, like elements are designated by the same numerals plus 100. Thus, the harvester is shown at 110 and the belt conveyor at 158, etc.

In this modification the seeds are taken out of the storage bin 122 through a side-delivery tube 181 to a usual conveyor tube which functions to transfer the seeds from the storage bin to the supplemental storage facility. The conveyor tube is discarded (there is no overhead conveyor in this form of the Prior Art) and the tube 181 is modified to provide a closed end 182 and a bottom opening 184 through which the seed is discharged. An auger, not shown because it is an unchanged part of the prior art device, moves the seed out of the storage bin 122 to the opening 184 where it falls into the hopper 154. The tube 181 slopes upwardly away from the side of the storage bin 122 so that the outward or closed end 182 is higher than the inward end 186 for a purpose to be presently described.

The conveyor 158 is mounted on a pivot post 188 which is telescoped in and rotates in pivot tube 190. The conveyor 158 is pivoted to arm 168 in a like manner as in FIG. 5 and is suspended from the frame of the harvester by a suitable chain 192 so that it can be swung around from the alongside position to the normally-disposed position and back. The tube 190 is mounted on support 176 affixed to the frame 178 and by rods 194 anchored to the frame. The bottom of pivot post 188 is fastened to a crank 196 operatively associated with a hydraulic cylinder 198 so that the conveyor can be swung from one position to the other.

Figure 5:
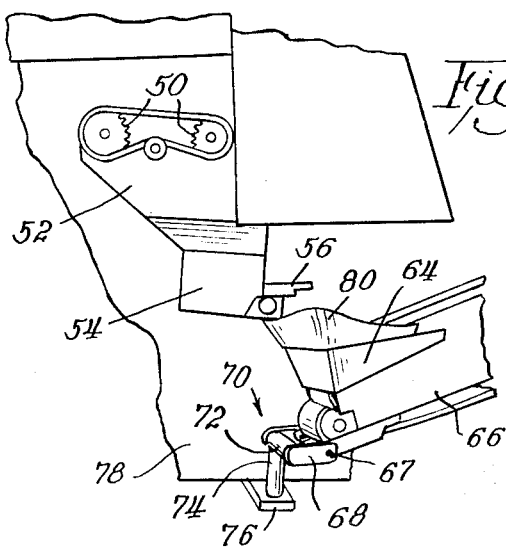
FIG. 5 is a detail view of FIG. 4 with the belt-conveyor alongside.

The hopper 164 swings in under the discharge opening 184 generally in the same way as in the modification of FIG. 5, but it is provided with a different type of boot. This boot has a high side 180*a* near side of the hopper, that is, on the side adjacent the harvester when it is in the alongside position, and tapers down to a low side 180*b* which, on account of the upward slope of the tube 181, goes in under the tube 181 as the conveyor 158 is swung to the normally-disposed position. As it does this, the high side 180*a* snugs up firm around the tube 181 as best seen in FIG. 9.

It is thus seen that seed-crop harvesters of the prior art which are not suitable for harvesting fragile seed crops, can can be readily and effectively converted, by the invention, into seed-crop harvesters which can be used to harvest fragile seed crops, even Great Northern and Michigan beans.

It is to be understood that the invention is not to be limited to the exact details of construction, operation, or exact materials or embodiments shown and described, as various modifications and equivalents will be apparent to those skilled in the art, and the invention is therefore to be limited only by the scope of the appended claims.

I claim:

1. In a seed-crop harvesting machine which comprises:
   gathering means for gathering seed-crop plants;
   separating means for separating the seed from the stalks and/or pods of the plants;
   a storage bin;
   elevator means for elevating the separated seed to said storage bin; and
   conveyor means for conveying separated seed from said storage bin to a supplemental storage facility not a part of said harvesting machine;
   the improvements which adapt said seed-crop harvesting machine to the harvesting of fragile seed-crops in which: said elevator means comprises a bucket elevator means;
   means for feeding seed into successive buckets after the bucket has started to rise in the elevator;
   said conveyor means comprises a belt conveyor means, and
   said elevator means and said conveyor means function to carry the separated seed rather than to drag it along,
   whereby attrition of the skins of the seeds is minimized or avoided.

2. A seed-crop harvesting machine which comprises:
   gathering means for gathering seed-crop plants;
   separating means for separating the seed from the stalks and/or pods of the plants;
   a storage bin;
   elevator means for elevating the separated seed to said storage bin; and
   conveyor means for conveying separated seed from said storage bin to a supplemental storage facility not a part of said harvesting machine; and
   the improvements which adapt said seed-crop harvesting machine to the harvesting of fragile seed-crops in which:
   said elevator means comprises a bucket elevator means; said conveyor means comprises a belt conveyor means;
   said elevator means and said conveyor means function to carry the separated seed rather than to drag it along,
   whereby attrition of the skins of the seeds is minimized or avoided;
   said bucket elevator means comprising:
   upcoming and downcoming buckets disposed on a continuous chain or belt;
   said buckets having rounded bottoms and cup-shaped tops; sump means adjacent the uppermost downcoming buckets;
   diverting means for diverting the seeds into said sump means as they spill from said cup-shaped buckets which comprises in part the rounded bottom of the downcoming bucket next below the one from which the seeds are spilled and in part a vertical wall separating said sump from the downcoming buckets and terminating between the positions occupied by the first and second downcoming buckets below the buckets from which the seeds are spilled; and
   transverse means in said sump means for transferring seeds collected therein to said storage bin.

3. A seed-crop harvesting machine of claim 2 in which:
   said elevator means comprises a housing, the sides of which are adjacent and parallel to upcoming and downcoming buckets except at the top where said housing merges into said sump means, with the topmost portion of said housing flaring away from the topmost buckets on the downcoming side, then down to said sump, and then upward as said vertical wall.

4. A seed-crop harvesting machine of claim 3 which further comprises:
   second transverse means for transferring separated seeds to said bucket elevator which second transverse means is located adjacent the bottom of said bucket elevator in position to discharge into upcoming buckets therein.

5. A seed-crop harvesting machine of claim 4 in which:
   said housing extends upwardly from adjacent said second transverse means at a slight angle to a point adjacent the top of said storage bin and adjacent to said first transverse means; and
   said angle is such that the free-fall vector of the spilling seeds forms a small acute angle with the centerline of the downcoming buckets thereby placing the rounded bottom of the downcoming bucket next below that from which the seeds are spilled more directly into the path of the falling seeds.

6. A seed-crop harvesting machine of claim 4 in which:
   both said transverse means comprise transverse screws disposed in transverse tubular housings having substantially horizontal bottoms;
   said transverse tubular housings are substantially larger in diameter than the vertical dimension of said screws, whereby the seeds are freely urged along the horizontal bottoms of said housings so that attrition of the seeds between the screw and the walls of the housing is minimized or avoided.

7. In a seed-crop harvesting machine which comprises:

gathering means for gathering seed-crop plants;
separating means for separating the seed from the stalks and/or pods of the plants;
a storage bin;
elevator means for elevating the separated seed to said storage bin; and
conveyor means for conveying separated seed from said storage bin to a supplemental storage facility not a part of said harvesting machine;
the improvement which adapts said seed-crop harvesting machine to the harvesting of fragile seed-crops in which:
said elevator means comprises a bucket elevator means; said conveyor means comprises a belt conveyor means;
said elevator means and said conveyor means function to carry the separated seed rather than to drag it along,
whereby attrition of the skins of the seeds is minimized or avoided; and in which
the storage bin is provided with a side delivery opening having a downwardly-opening discharge opening and
said belt conveyor is provided with a hopper adapted to be disposed beneath said downwardly-opening discharge opening; .
the hopper of the belt conveyor is hinged to said machine so that in one position the belt conveyor lies alongside the machine and in another position it is disposed normally thereto for delivery to said supplemental storage facility and in the normally-disposed position said hopper is disposed under and in alignment with said discharge opening;
the hopper has a flexible boot adapted to encompass said discharge opening when the conveyor is swung to the normally-disposed position; and
the boot is shaped relative to the discharge opening so that it swings into engagement under the discharge opening when the conveyor is swung to the normally-disposed position.

8. A seed-crop harvesting machine of claim 7 in which:
the discharge opening is in the underside of a short projecting tube which communicates with said storage bin and through which tube and discharge opening the seeds in said storage bin are discharged;
said tube has a small upward slant so that the end away from said machine is at a slightly higher elevation than the end adjacent the machine; and
said boot tapering from a high side which is high enough to lap said tube to a low side which is adapted to pass under said tube as the conveyor is swung to the normally-disposed position, whereby said boot is lapped around said tube and encompasses said discharge opening.

9. A seed-crop harvesting machine of claim 7 in which:
said discharge opening comprises a vertically-disposed chute and said boot has outwardly-flaring sides adapted loosely to encompass said chute when said conveyor is swung to the normally-disposed position.

10. A method for converting a seed-crop harvesting machine into such machine which can be used for harvesting of fragile seed-crops, which machine comprises a separator; a storage bin; elevator means for elevating separated seeds to said storage bin; sump means communicating with said storage bin; and a screw conveyor having a vertical component for transferring the seeds from said sump to a supplemental storage facility, which method comprises:
providing a lateral discharge chute opening into said sump and having a bottom discharge opening exterior of said storage bin;
mounting a belt conveyor provided with a generally rectangular-mouthed hopper in such a manner that the conveyor can be swung from a position alongside of said machine to a position normal thereto;
said hopper being mounted on hinge means such that the conveyor pivots about a corner of the hopper which is adjacent the machine in both positions of said conveyor whereby, when the conveyor is swung around to the normally-disposed position, the hopper is centered under the discharge opening;
mounting a flexible boot on said hopper which is shaped relative to the discharge opening so that it swings in under the discharge opening when the conveyor is swung to the normally-disposed position; and
replacing said elevator means with a bucket elevator means.

11. A method of claim 10 in which:
the discharge opening is in the underside of a short projecting tube which communicates with said storage bin and through which tube and discharge opening the seeds in said storage bin are discharged;
said tube having a small upward slant so that the end away from said machine is at a slightly higher elevation than the end adjacent the machine; and
which further comprises:
tapering said boot from a high side which is high enough to lap said tube to a low side which is adapted to pass under said tube as the conveyor is swung to the normally-disposed position, whereby said boot is lapped around said tube and encompasses said discharge opening.

12. A method of claim 10 in which:
said discharge opening is at the bottom of a vertically-disposed chute and
which further comprises:
outwardly-flaring the sides of said boot so that they loosely encompass the outside of said chute when said conveyor is swung to the normally-disposed position.

* * * * *

UNITED STATES PATENT AND TRADEMARK OFFICE
CERTIFICATE OF CORRECTION

PATENT NO. : 4,800,902

DATED : January 31, 1989

INVENTOR(S) : Gale E. Maust

It is certified that error appears in the above-identified patent and that said Letters Patent is hereby corrected as shown below:

Col. 7, line 10; after "180a" insert -- on the --

Signed and Sealed this

Twenty-seventh Day of June, 1989

Attest:

DONALD J. QUIGG

Attesting Officer

Commissioner of Patents and Trademarks